United States Patent
Van Der Kamp et al.

(10) Patent No.: US 12,108,733 B2
(45) Date of Patent: Oct. 8, 2024

(54) ROBOT MILKING DEVICE

(71) Applicant: LELY PATENT N.V., Maassluis (NL)

(72) Inventors: Adolf Jan Van Der Kamp, Kampen (NL); Rutger Friso Van De Streek, Broek (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 18/245,755

(22) PCT Filed: Sep. 28, 2021

(86) PCT No.: PCT/IB2021/058823
§ 371 (c)(1),
(2) Date: Mar. 17, 2023

(87) PCT Pub. No.: WO2022/070024
PCT Pub. Date: Apr. 7, 2022

(65) Prior Publication Data

US 2023/0354765 A1    Nov. 9, 2023

(30) Foreign Application Priority Data

Oct. 1, 2020 (NL) ........................ 2026602

(51) Int. Cl.
*A01J 5/017* (2006.01)
*A01J 5/007* (2006.01)

(52) U.S. Cl.
CPC ............. *A01J 5/0175* (2013.01); *A01J 5/007* (2013.01)

(58) Field of Classification Search
CPC .................................. A01J 5/0175; A01J 5/007
See application file for complete search history.

(56) References Cited

U.S. PATENT DOCUMENTS 5,778,820 A * 7/1998 van der Lely ........... A01K 5/02
                                                                119/51.02
5,782,199 A * 7/1998 Oosterling ........... A01K 1/0023
                                                                119/14.02

(Continued)

FOREIGN PATENT DOCUMENTS

| EP | 0 677 243 A2 | 10/1995 |
| EP | 0 869 708 A1 | 10/1998 |
| WO | WO 97/13403 A1 | 4/1997 |

OTHER PUBLICATIONS

International Search Report issued Dec. 1, 2021 in PCT/IB2021/058823, filed on Sep. 28, 2021, 2 pages.

*Primary Examiner* — Christopher D Hutchens
*Assistant Examiner* — Edgar Reyes
(74) *Attorney, Agent, or Firm* — Oblon, McClelland, Maier & Neustadt, L.L.P.

(57) ABSTRACT

A method for milking a dairy animal with a robot milking device including a teat position determination system and a controller. The method includes allowing the robot milking device, with the help of the teat position determination system, to make one or more connection attempts for connecting at least one milking cup to a teat of the dairy animal, and milking with all connected milking cups where the controller records a number of failed connection attempts. The number of failed connection attempts #MA in a predefined number of milkings, which number of milkings is at least equal to a predefined number #MB, fulfils a predefined criterion, automatically adapting the milking criterion by means of the controller.

14 Claims, 1 Drawing Sheet

(56) References Cited

U.S. PATENT DOCUMENTS

Figure 1:
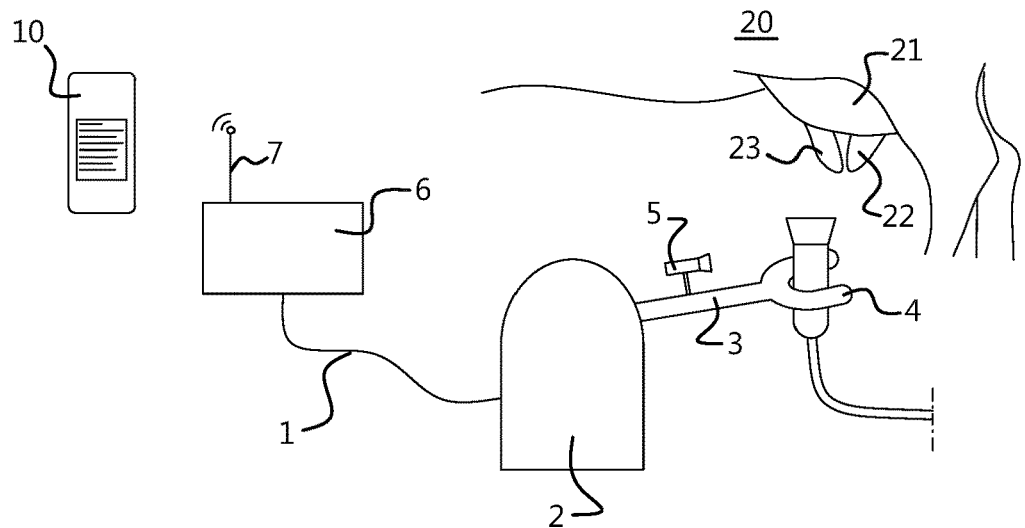

| | | | | |
|---|---|---|---|---|
| 5,931,115 A * | 8/1999 | Lind | ............... | A01J 5/007 |
| | | | | 119/14.02 |
| 6,055,930 A * | 5/2000 | Stein | ............... | A01J 7/04 |
| | | | | 119/14.08 |
| 6,062,164 A * | 5/2000 | Oosterling | ............... | A01K 1/12 |
| | | | | 119/14.02 |
| 6,363,883 B1 * | 4/2002 | Birk | ............... | A01J 5/0175 |
| | | | | 119/14.08 |
| 6,367,416 B1 * | 4/2002 | van der Lely | ............... | A01J 5/0175 |
| | | | | 119/14.02 |
| 2014/0000520 A1 | 1/2014 | Bareket | | |
| 2020/0187448 A1 * | 6/2020 | Voorsluys | ............... | A01J 5/007 |

* cited by examiner

ROBOT MILKING DEVICE

CROSS REFERENCE TO RELATED APPLICATIONS

This application is a National Stage entry under 35 U.S.C. § 371 of PCT/IB2021/058823, filed on Sep. 28, 2021, and claims priority to Netherlands Patent Application No. 2026602, filed on Oct. 1, 2020. The entire contents of both are incorporated herein by reference.

The invention concerns a method for milking a dairy animal by means of a robot milking device with a teat position determination system and a controller, comprising, if the dairy animal fulfils a milking criterion, in a milking, allowing the robot milking device with the help of a teat position determination system to make one or more connection attempts for connecting at least one milking cup to a teat of the dairy animal, and milking with all connected milking cups, wherein the controller records the number of failed connection attempts.

Such milking methods are known in the prior art. A milking robot has a teat detection system and a robot arm which, with the help of the controller, can attach milking cups to detected teats of the dairy animal. Sometimes an attempt to connect a milking cup to a teat does not succeed first time. Sometimes, connection of one or more milking cups fails even after repeated attempts. It is then possible to milk only the connected milking cups, or to reject the milking of the dairy animal i.e. in fact milk with no milking cups, or to milk the dairy animal under supervision, wherein a person attaches the unconnected milking cups to a teat.

A disadvantage of failed connection attempts is obviously that the robot milking device is then occupied for longer than necessary, so that the milk yield of the method is less than the maximum achievable.

It is an object of the present application to improve the known method such that the maximum milk yield achievable with the robot milking device can be increased.

The invention achieves this object with a method as claimed in claim 1, in particular a method for milking a dairy animal by means of a robot milking device with a teat position determination system and a controller, comprising, if the dairy animal fulfils a milking criterion, in a milking, allowing the robot milking device with the help of a teat position determination system to make one or more connection attempts for connecting at least one milking cup to a teat of the dairy animal, milking with all connected milking cups, wherein the controller records the number of failed connection attempts, if the number failed connection attempts #MA in a predefined number of milkings, which number of milkings is at least equal to a predefined number #MB, fulfils a predefined criterion, automatically adapting the milking criterion by means of the controller.

The idea behind the invention is as follows. Each robot milking device requires a teat position determination system in order to be able to determine the positions of the teats. In addition, for each dairy animal, a milking criterion applies, on the basis of which the controller determines whether or not the dairy animal should be milked. The positions of the teats are influenced by the fill level of the udder. The fill level of the udder in turn is influenced by the milking interval. Therefore the idea arose, if there are too many failed connection attempts, to try and make the teat position more favorable by adapting the milking criterion. The controller can in any case attempt to change the teat position by adapting the milking criterion, so that the resulting teat position may perhaps be suitable for detection by the teat position determination system. The controller can achieve this by changing the fill level of the udder by changing the milking criterion, i.e. admission criterion for allowing milking. On a following milking, the teat position determination system may try to determine the teat positions again. If and when this is successful, the new milking criterion may be for example set fixedly (at least temporarily).

It is noted here that automatic adaptation of the milking criterion by the controller is known in itself for increasing or decreasing milk production. Insofar as the inventors are aware, this adaptation has not previously been made on the basis of the number of failed connection attempts, as in the present invention.

It is furthermore pointed out that a "failed connection attempt" initially means a failed attempt to connect a milking cup to a teat. More particularly, a more stringent description may be applied such as "during milking, after repeated attempts, connection of this milking cup fails", or even more stringently "even after repeated attempts, the complete milking fails". For the present invention, all three descriptions are applicable. In any case, it is certainly relevant if at least one teat is not milked in a milking because that is undesirable for cow health and milk yield. But the failure of a connection attempt can itself provide relevant information, because the occurring thereof more often a threshold can lead to a delay in milking and hence to reduced milking capacity of the robot.

Particular embodiments of the invention are described in the dependent claims and in the following part of the description.

In particular, the adaptation of the milking criterion comprises extending the desired time between two milkings of the dairy animal. Often, it is difficult for the teat position determination system to correctly identify two teats which are close together, and to determine animal positions. By extending the desired time between two milkings, i.e. the milking interval/inter-milking time, the udder will fill more and there is a good chance that the teats will move further apart, certainly after stimulation, so that the chance of a failed connection attempt will become lower.

It is expressly pointed out that increasing the milking frequency, i.e. the desired number of milkings per day, is regarded as equivalent to extending the desired milking interval and to increasing a milk yield threshold, which equivalence is known in itself in the prior art. It may also occur that the controller automatically adapts the intended or desired milking interval on the basis of a modified milk production. Normally speaking however, said adaptation is intended for example to stimulate milk production by preventing the udder from becoming truly full. But the present invention is directed at precisely the situation that the dairy animal cannot be milked at all at the desired interval due to failed connection. For then milking is postponed until the manager comes to milk the animal, if the animal is not rather culled. It is then better to deliberately wait and milk the animal as yet, in any case with a greater chance of success, and thereby cause less work for the manager.

In particular, the extending comprises: extending the desired mean milking interval if, for milkings with a milking interval which is at least as long as the desired milking interval, the number of failed connection attempts is at least equal to a predefined threshold #MIgem. Alternatively or additionally, the extending comprises: extending the minimum milking interval if, for milkings with a milking interval which is shorter than the desired milking interval for said dairy animal, #MA is at least equal to a predefined threshold #MImin.

Usually, dairy animals do not visit the robot milking device with perfect regularity. If a dairy animal is less than a predefined duration or percentage before the desired milking interval, the animal is still admitted for milking (it fulfils the milking criterion). This duration is for example two hours or for example 20% of the milking interval. These values may be selected depending on the animal, for example in connection with how regularly the dairy animal visits the robot. If the number of failed connection attempts in the time preceding the desired milking interval exceeds the threshold, it may be useful to extend the minimum milking interval without having to extend the desired milking interval. The dairy animal is thus not admitted for milking so soon, while yet the aim is not to increase the number of milkings per day. Thus the udder will be better filled and the chance of correct connection is greater. By not extending the average milking interval, it is ensured that the udder does not become unnecessarily heavy, which can cause discomfort for the dairy animal. On the other hand, in some embodiments it is desirable to extend the average or desired milking interval if it appears that the number of failed connection attempts exceeds a threshold (even) with milking intervals which are at least as long as the desired milking interval. Analysis of the failures may show which extended milking interval is suitable. If the number of failed connection attempts decreases greatly with milking intervals which are for example 10% longer than the currently desired milking interval, it is sensible to extend the desired milking interval or even the minimum milking interval by 10%.

In some cases, it may occur that, precisely with a full udder, the teats are closer together and connection fails or at least is not as successful. With such udders, for example, the location of the respective teats is such that on swelling of the quarter, the teats move closer to the middle of the udder, and hence closer together. For such cases, there are particular embodiments in which adapting the milking criterion comprises shortening the desired time between two milkings. In particular, shortening comprises: shortening the desired time between two milkings if, for milkings with a milking interval which is at most as long as the desired milking interval, the number of failed connection attempts is higher than a predefined threshold. In such a case it appears pointless to attempt to milk the dairy animal, and automatic milking can only succeed reliably with a shorter desired milking interval. Also, since dairy animals are not robots and will visit the robot irregularly, it may still occur that the dairy animals concerned visit the robot later than the (maximum or desired) milking interval. Then the robot milking device knows in advance that connection and milking will be too unreliable, and the controller, already upon detection, can decide to carry out an alternative action such as expelling from the robot and separating the dairy animal, or notifying a manager for milking under supervision.

It may also occur that the extent to which the teats stand obliquely varies with the udder fill level. The more oblique a teat stands, the greater the chance that the teat will draw in leakage air during milking. If there is too much leakage air, a milking is also interrupted and the connection attempt is also considered failed. In theory, this can lead to a situation with a dairy animal with teats which point directly downward but are close together, but on further filling of the udder point more towards the outside and hence stand further apart. Connection itself will proceed better but the actual milking is less reliable. Nonetheless, the controller in such a case can automatically and independently look for an optimum by varying the milking criterion.

In some embodiments, the adapting of the milking criterion comprises measuring, in particular by a teat position determination system, a distance between two teats, in particular between the front teats or between the rear teats, and extending the desired time between two milkings of the dairy animal if said distance is smaller than a respective minimum distance. Often it is known in practice which minimum distance between teats reduces the connection reliability. The distance can be measured by the manager at for example a desired milking interval, such as by estimation, and in particular before a connection attempt. Also, the teat position determination system could measure this distance as long as the system can distinguish between the two teats concerned. For example, the system sees two different transitions from udder to teat, but the teat tips lie close together and cannot be adequately separated. The distance is then actually zero while the system still sees that there are two teats. The minimum distance may be different for the front teats and rear teats, for example because the distance between the teats and the teat position determination system may be different.

In some embodiments, the extending comprises extending by a predefined time period in hours or a percentage of the momentary desired milking interval for said dairy animal. This extending may then take place for example by 15 minutes or 5% of the momentary desired milking interval. It is also possible to repeat this step if the number of failed connection attempts decreases insufficiently, in particular to repeat this a maximum number of times such as three times, in order to prevent over-long milking intervals. Also this applies similarly to shortening the milking interval.

In some embodiments, the adapting of the milking criterion comprises: if the dairy animal is within Z days of a desired drying-off date for the dairy animal and the total or mean milk yield of the dairy animal during a predefined number of preceding days is lower than a predefined threshold yield, or if the dairy animal is within Y days of said desired drying-off date, then by means of the controller carrying out an action for drying off. In particular, the method furthermore comprises sending a warning to the manager of the robot milking device, in particular in the form of an attention list message, a sms or push message, or an audible or visible alarm signal. Such an action may consist simply of recording on the attention list the status "dry off", and/or sending a message of this status to the manager via a sms or push message etc. Alternatively or additionally, the action may also comprise reducing, e.g. to zero, the concentrate supply in the robot milking device, which can help lower the milk production before the actual drying off action is carried out by the manager or vet. With a very low milk production, the action may even comprise no longer milking the dairy animal concerned.

In a second aspect, the invention concerns a robot milking device for milking the dairy animal, which is configured for performing a method according to the first aspect of the present invention. The robot milking device comprises milking means with one or more milking cups, a teat position determination system, a robot arm for attaching, with the help of the teat position determination system, the or each milking cup to a teat of the dairy animal in one or more connection attempts, a controller which is configured for controlling the robot milking device and recording the number of failed connection attempts, and which for each dairy animal contains a milking criterion for deciding whether or not to milk a dairy animal. Such a robot milking device offers the same advantages as described for the method. In brief, the robot milking device can independently and automatically extend the desired milking interval (inter-milking time, time between two milking events) depending on the number of failed connection attempts in order to try and reduce this number.

In particular embodiments, the teat position determination system is configured for measuring the distance between two teats of the dairy animal, in particular between the front teats and between the rear teats. If the measured distance is smaller than a general or respective threshold distance, the chance of failed connection is (too) great. In this case, the controller may adapt the milking criterion such that the distance is greater than the threshold, for example by extending the milking interval.

In some embodiments, the controller is configured for sending a warning to a manager of the robot milking device, in particular for recording in an attention list, or comprising a device for generating a sms or push message, or an audible or visible alarm signal. In this way, the controller can inform the manager of the herd of dairy animals about the status of a specific dairy animal.

Figure 2A:
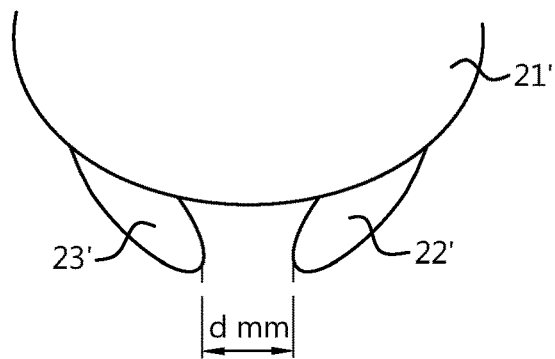
Figure 2B:
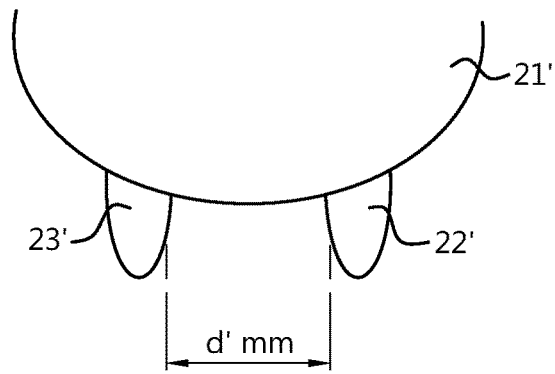

The invention will now be explained in more detail with reference to the drawing in which:

FIG. 1 shows a schematic view of a robot milking device according to the invention, and FIGS. 2a and 2b show a schematic view of an udder after a first and second milking interval respectively.

FIG. 1 shows a schematic view of a robot milking device 1 according to the invention, with a robot unit 2, a robot arm 3, a milking cup 4, a teat camera 5, a controller 6 and a transmission antenna 7. Reference 10 indicates a mobile telephone, and 20 a dairy animal with an udder 21, a first teat 22 and a second teat 23.

A robot milking device 1, referred to below in brief as a 'robot', is a milking device that can automatically connect the milking cups 4 to the teats 22, 23 of a dairy animal 20, usually a cow, goat, buffalo or similar. The number of milking cups 4 also preferably corresponds to the number of teats of the dairy animal 20.

To be able to connect, the robot has a teat position determination device, here in the form of a teat camera 5 or laser scanner, and a robot arm 3. The teat camera records an image of the udder 21 with teats 22, 23, and the controller or a program installed in the camera 5 processes the images in order to determine therefrom the position of the teats. On the basis of the determined position(s), the controller 6 can then operate the robot arm 3 to attach the milking cup 4 to the teats 22, 23.

The teats 22, 23 may lie close together, in particular at the teat tips. Sometimes, as in the example shown, they lie so close together that the teat position determination device 5 cannot adequately distinguish the teats from one another, or the robot arm 3 cannot connect the milking cup 4 to the correct teat sufficiently reliably. In both cases, a failed connection attempt is recorded by the controller 6. In itself, a failed connection attempt is not unusual. Normally a new attempt is then made, either until it succeeds or until a maximum permitted number of failed connection attempts has been reached, after which the milking of this teat or even as a whole is recorded as failed.

It is also possible that the state of the teats is such that one or more rear teats lie unfavorably with respect to the teat position determination device 5, and for example are largely concealed by the front teats. Possibly a mark or other pigmentation may be situated undesirably for the teat position determination. It is however important that the number of failed connection attempts can be undesirably large, such as 3 or more in the preceding 7 days. This requires a disproportionately large amount of work by the herd manager, who in any case must milk the animal concerned under supervision or take other measures. In the extreme case, the dairy animal may be culled from the herd. The present invention attempts to counter this by deliberately influencing the teat position by influencing the milking criterion, and in particular the milking interval.

It is also possible that the dairy animal concerned is approaching the end of lactation. It is then pointless or even impossible to suitably influence the udder fill level and hence the teat position. For example, in the case of a dairy cow, the dairy animal may be in lactation for more than a predefined number of days, such as 220 days. In such a case, the controller can decide to end the lactation. For example, the controller 6 gives the instruction not to provide any more concentrate to said dairy animal 20, and no longer milk said dairy animal in the robot 1 or elsewhere. It is however more important that the manager of the dairy animal 20 receives a message from the controller 6, for example as a sms message on his mobile phone 10, or at least a note on the attention list. On this basis, the manager may then initiate other actions for the purpose of drying off. Alternatively, the dairy animal is not so close to the end of its lactation, but for example between 175 and 220 days in lactation. If her milk production then for example falls below a threshold such as 10 or 11 kg per day, the controller 6 may also decide to dry off because the milk yield is not economic when set against the occupation time of the robot 1 and the extra work for milking under supervision etc. Obviously, these figures may be adapted. For example, the occupation level of the robot 1 is very low, allowing the number of failed connection attempts to be set high, and the above-mentioned threshold milking level is low. Conversely, with a busy robot 1, it may be decided to set a low number of failed connection attempts and a high daily milk yield threshold and the like.

It is possible that the teat position determination device 5 is configured to determine the distance between the teats 22, 23. In the case shown, two teats can be identified because the respective attachments to the udder 21 are clearly physically separate. The tips of the teats 22, 23 almost touch one another, so the distance between the two teats 22, 23 is very small, such as less than 50 mm. The controller then knows that connection will be too unreliable because the milking cup may for example be attached to the incorrect teats 22, 23 which is undesired.

Both the measured distance and the results of failed connection attempts may lead to a follow-up action according to the invention, which is changing the milking criterion such as extending the mean milking interval. This is explained with reference to FIG. 2.

FIGS. 2a and 2b show a schematic view of an udder 21' with a first teat 22' and a second teat 23' after a first and second milking interval respectively, wherein the second is longer than the first.

The teats 22', 23' are for example two front teats or two rear teats, but may in some cases also be one front and one rear teat. This applies for healthy cows, but not for goats (with two teats) or other animals with different numbers of teats.

In FIG. 2a, the teats 22' and 23' have too small a spacing d, for example 40 mm, for reliable connection. This distance applies for a milking interval T of for example 10 hours. Now, it is possible that the teats 22' and 23' will stand further apart if the udder is more filled. A higher udder fill level is achieved for example with a longer milking interval, as shown for example in FIG. 2b. Here, the milking interval is for example T'=11 hours. This udder fill level, which is on average around 10% higher, means that in this (theoretical) case the udder bulges, and the distance between the teats 22' and 23' is now d', e.g. 80 mm. For this robot for example, this may well be sufficient for reliable connection.

Of course, the figures given are merely examples and may be adapted freely on the basis of the robot specifications and/or results from a herd in practice. The important factor however is the advantage of such a robot which can perform a method according to the invention, wherein the milking criterion, in particular the milking interval, can be adapted automatically by the controller on the basis of the number of failed connection attempts in order to reduce said number.

The invention claimed is:

1. A method for milking a dairy animal with a robot milking device comprising a teat position determination system and a controller, wherein the method comprises:
    allowing the robot milking device, with the help of the teat position determination system, to make one or more connection attempts for connecting at least one milking cup to a teat of the dairy animal which fulfils a milking criterion; and
    milking with all connected milking cups, wherein the controller records a number of failed connection attempts; and
    automatically adapting the milking criterion by means of the controller if the number of failed connection attempts #MA in a predefined number of milkings, which number of milkings is at least equal to a predefined number #MB, fulfils a predefined criterion.

2. The method of claim 1, wherein the adapting the milking criterion comprises extending a desired time between two milkings of the dairy animal.

3. The method of claim 2, wherein the extending comprises: extending the desired time between two milkings of the dairy animal with a milking interval which is at least as long as a desired milking interval, and wherein the number of failed connection attempts is at least equal to a predefined threshold #MIgem.

4. The method of claim 2, wherein the extending comprises: extending a minimum milking interval for milkings with a milking interval which is shorter than a desired milking interval for said dairy animal, wherein #MA is at least equal to a predefined threshold #MImin.

5. The method of claim 2, wherein the extending comprises extending by a predefined time period in hours or a percentage of a momentary desired milking interval for said dairy animal.

6. The method of claim 1, wherein the adapting of the milking criterion comprises measuring a distance between two teats, and extending a desired time between two milkings of the dairy animal if said distance is smaller than a respective minimum distance.

7. The method of claim 6, where the distance between two teats is between front teats and between rear teats.

8. The method of claim 1, wherein the adapting of the milking criterion comprises:
    adapting if the dairy animal is within Z days of a desired drying-off date for the dairy animal, and a total or mean milk yield of the dairy animal during a predefined number of preceding days is lower than a predefined threshold yield, or
    adapting if the dairy animal is within Y days from said desired drying-off date and
    then by means of the controller, carrying out an action for drying off.

9. The method of claim 1, further comprising sending a warning to a manager of the robot milking device.

10. A robot milking device for milking a dairy animal, configured for performing the method of claim 1, comprising:
    a milking means with one or more milking cups;
    the teat position determination system;
    a robot arm for attaching, with the help of the teat position determination system, each milking cup to a teat of the dairy animal in one or more connection attempts; and
    the controller which is configured for controlling the robot milking device and recording the number of failed connection attempts, and which for each dairy animal contains a milking criterion for deciding whether or not to milk the dairy animal.

11. The robot milking device of claim 10, wherein the teat position determination system is configured for measuring a distance between two teats of the dairy animal.

12. The robot milking device of claim 11, wherein the distance between two teats of the dairy animal is between front teats and between rear teats.

13. The robot milking device of claim 10, wherein the controller is configured for sending a warning to a manager of the robot milking device.

14. The robot milking device of claim 13, wherein the warning is a sms, a push message, or an audible or visible alarm signal.

* * * * *